No. 660,459. Patented Oct. 23, 1900.
H. G. REIST.
SLOT WEDGE FOR DYNAMO ELECTRIC MACHINES.
(Application filed Aug. 21, 1900.)
(No Model.)

Witnesses:

Inventor.
Henry G. Reist,
by Albert G. Davis
Atty

United States Patent Office.

HENRY G. REIST, OF SCHENECTADY, NEW YORK, ASSIGNOR TO THE GENERAL ELECTRIC COMPANY, OF NEW YORK.

SLOT-WEDGE FOR DYNAMO-ELECTRIC MACHINES.

SPECIFICATION forming part of Letters Patent No. 660,459, dated October 23, 1900.

Application filed August 21, 1900. Serial No. 27,575. (No model.)

*To all whom it may concern:*

Be it known that I, HENRY G. REIST, a citizen of the United States, residing at Schenectady, county of Schenectady, State of New York, have invented certain new and useful Improvements in Slot-Wedges for Dynamo-Electric Machines, (Case No. 1,812,) of which the following is a specification.

In dynamo-electric machines having toothed cores the distribution of the magnetic field is very uneven, the field being very dense in the teeth and of comparatively low value between the teeth. This gives rise to a sort of tufted distribution of flux in the air-gap. This uneven flux acting upon the opposing surface of the relatively-revolving member of the machine produces therein undesirable heating, due to eddy-currents and hysteresis. This is particularly true in machines having pole-pieces excited by direct current—such, for example, as alternating-current generators, synchronous motors, or rotary converters. Where these machines are provided with antihunting devices—such, for example, as copper bridges between the pole-pieces or similar devices—the losses are still greater. I have found that the losses referred to may be largely reduced by closing over the slots by means of magnetic material. One embodiment of my invention consists in replacing the wooden slot-wedges ordinarily used for holding the coils in place by similarly-shaped wedges formed of laminated iron. These wedges being of magnetic material bridge over the gaps between the core-teeth and largely reduce the unevenness of flux in the air-gap and at the same time, by reason of their laminated structure, do not become seats of induced currents.

The drawings represent an embodiment of my invention, the novel features of which are pointed out in the appended claims.

Figure 1:
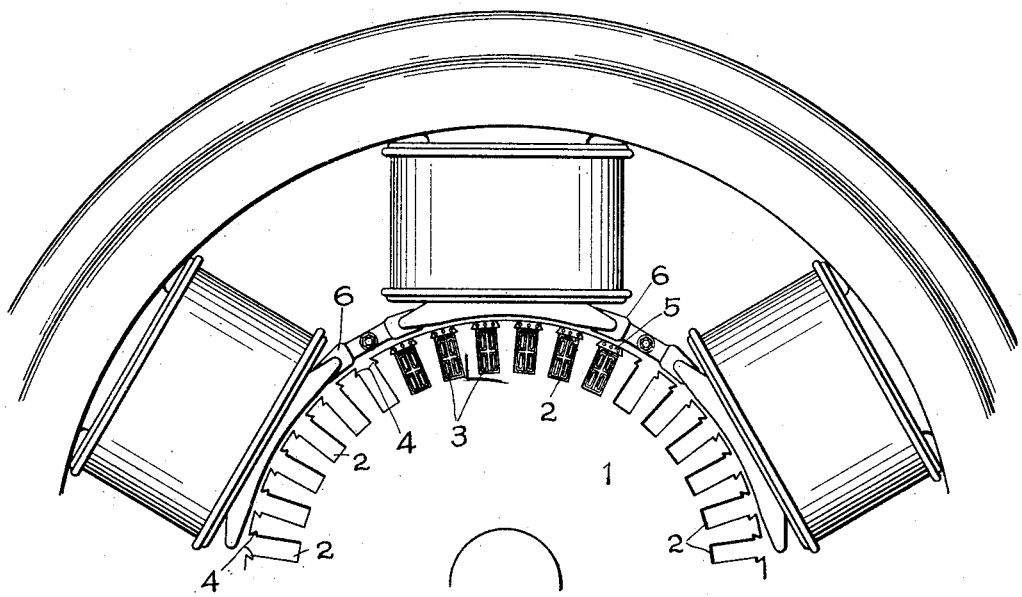
Figure 2:
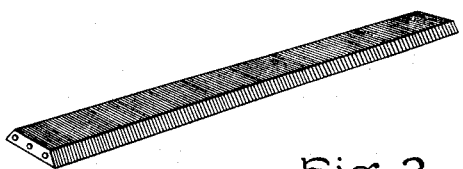

Figure 1 represents a portion of a dynamo-electric machine to which my invention is applied. Fig. 2 is a detail view of a self-retaining slot-closing device used in connection with the machine represented in Fig. 1.

Fig. 1 is intended to represent a portion of a dynamo-electric machine, one member of which—as, for example, the rotating member 1—is provided in the usual manner with a series of slots 2, which serve to retain the windings, (indicated in section at 3.) The ends of the teeth which form the walls of the slots are cut away, as shown at 4, for example, so as to form seats for slot-wedges, which are driven in to hold the coils in place. The wedges which I employ for this purpose are formed of laminated iron, a view of one of the wedges being shown in perspective in Fig. 2. The wedges are built up by assembling suitably-shaped stampings upon a number of parallel rods, which when the requisite number of stampings are in place are upset at their ends, so as to hold the stampings together in the form of a comparatively rigid bar. The shape of the stampings conforms to the shape of the cross-section of slot-closing device which it is desired to employ and may obviously vary considerably in form. At 5 I have indicated a form of stamping which I have found useful.

My invention is applicable to many types of dynamo-electric machines; but I have found it of particular value in connection with synchronous alternating-current machines, and for that reason I have shown it in Fig. 1 as applied to such a machine. This machine is provided with copper bridges 6, extending between the field-poles—for example, such bridges as are shown in a certain patent to Geisenhoner and Knight, No. 650,677. As these bridges are formed of solid copper, the use of my invention in this relation is particularly valuable, since it prevents an otherwise considerable waste due to eddy-currents set up in the copper by the irregular field distribution which would exist without the use of some form of slot-closing device of magnetic material, such as I have above described.

What I claim as new, and desire to secure by Letters Patent of the United States, is—

1. The combination with a dynamo-electric machine having coil-retaining slots, of slot-closing devices of laminated magnetic material.

2. The combination with a dynamo-electric machine having coil-retaining slots, of self-retaining slot-closing devices of laminated magnetic material.

3. As an article of manufacture, a slot-closing device for dynamo-electric machines, consisting of a laminated bar of magnetic material.

4. As an article of manufacture, a slot-wedge for dynamo-electric machines, consisting of a transversely-laminated bar of magnetic material.

5. The combination with a slotted armature, of laminated slot-wedges therefor.

6. The combination with a slotted armature, of laminated slot-wedges of magnetic material.

7. A slot-closing device for dynamo-electric machines consisting of laminæ assembled upon and held together by rods.

8. The combination in a dynamo-electric machine, of antihunting conductors, with an armature having its periphery composed of a substantially-continuous ring of magnetic material.

In witness whereof I have hereunto set my hand this 20th day of August, 1900.

HENRY G. REIST.

Witnesses:
BENJAMIN B. HULL,
FRED RUSS.